United States Patent [19]

Munk

[11] 4,073,851

[45] Feb. 14, 1978

[54] METHOD OF MAKING MOLDED BODIES FROM LIGNO-CELLULOSE PARTICLES

[75] Inventor: Edmund E. Munk, Oberstenfeld, Germany

[73] Assignee: Werzalit Pressholzwerk J.F. Werz K.G., Oberstenfeld near Stuttgart, Germany

[21] Appl. No.: 341,607

[22] Filed: Mar. 15, 1973

Related U.S. Application Data

[63] Continuation of Ser. No. 101,028, Dec. 23, 1970, abandoned.

[30] Foreign Application Priority Data

July 15, 1970 Germany ............................ 2035053

[51] Int. Cl.2 ................................................ B29J 5/06

[52] U.S. Cl. ................................... 264/109; 264/325

[58] Field of Search ............... 264/325, 324, 292, 257, 264/109, 121; 425/385, 398

[56] References Cited

U.S. PATENT DOCUMENTS

| | | | |
|---|---|---|---|
| 2,330,762 | 9/1943 | Tooker | 425/DIG. 58 |
| 2,747,231 | 5/1956 | Reinhardt | 264/111 X |
| 3,166,617 | 1/1965 | Munk | 264/109 |
| 3,354,248 | 11/1967 | Haas | 264/119 |
| 3,596,314 | 8/1971 | Krugler | 18/5 |

*Primary Examiner*—Richard R. Kucia

*Attorney, Agent, or Firm*—Michael J. Striker

[57] ABSTRACT

A two-section die is provided in one section with a cavity having an open side, a surface opposite the open side, and an exposed face connecting the open side and the surface and including with the latter a steep angle. The exposed face is provided with steps which extend transversely of the direction of movement performed by the second or male section of the die which is movable into the cavity for compressing a flowable mixture of ligno-cellulose particles and binder material placed into the cavity, and which has faces and surfaces juxtaposed with the respective face and surface of the cavity so as to compress between them the mixture; the pourable mixture is retarded against displacement in direction towards the surface during such movement, due to the presence of the steps.

5 Claims, 13 Drawing Figures

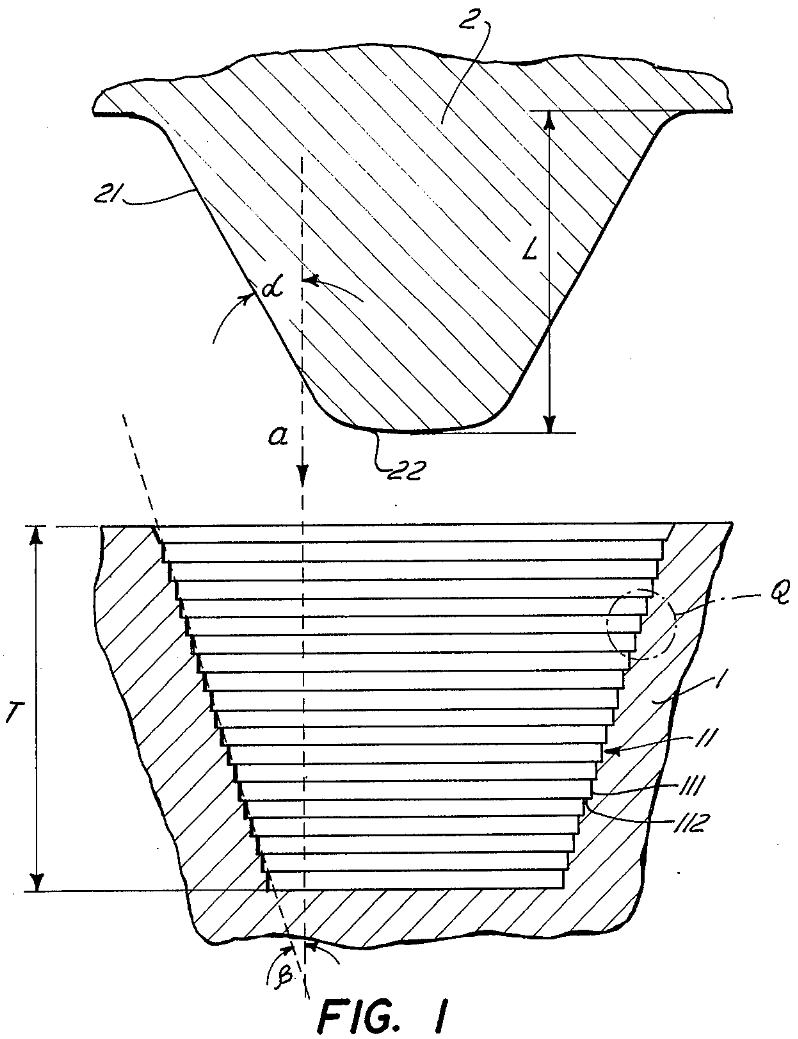
FIG. 1
FIG. 2
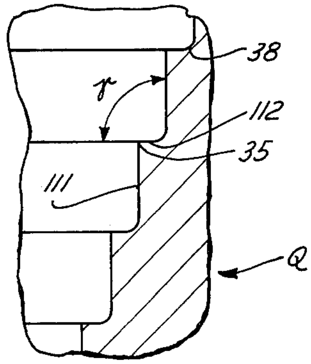
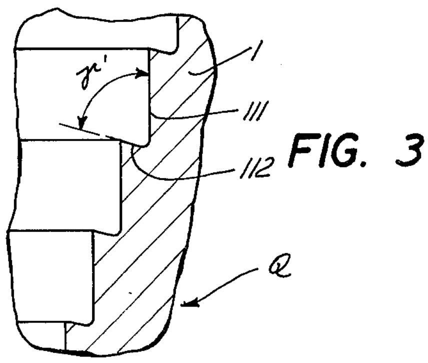
FIG. 3
INVENTOR
EDMUND E. HUNIC
BY
ATTORNEY

INVENTOR
EDMUND E. MUNK
BY
ATTORNEY

INVENTOR
EDMUND E. HUNIL
BY
ATTORNEY

INVENTOR
EDMUND E. MUNK
BY
ATTORNEY

INVENTOR
EDMUND E. HUNK
BY
ATTORNEY

INVENTOR
Edmund E. Hodik
BY
ATTORNEY

METHOD OF MAKING MOLDED BODIES FROM LIGNO-CELLULOSE PARTICLES

This is a continuation, of application Ser. No. 101,028, filed Dec. 23, 1970, now abandoned.

BACKGROUND OF THE INVENTION

The present invention relates generally to the making of molded bodies from ligno-cellulose particles, and more particularly to a method of making such bodies.

Molded bodies made from ligno-cellulose particles are already known. Such particles may be in the form of chips and fibers and have suitable binder material or materials added to them whereupon they are subjected to compression in a suitable die or mold to receive the configuration desired. It is conventional to provide one mold having a cavity and another mold or die which can enter into this cavity and which presses between itself and the surfaces bounding the cavity the mixture of particles and binder to the desired configuration.

The problems with this known molding of such particles exist if the finished body is for instance to have two surfaces which include a steep angle with one another, such as surfaces on obliquely inclined side walls of hollow bodies including trough-shaped containers or the like, of flanges or arms on profiled-cross-sectioned bodies, of plate- or strip-shaped parts of molded bodies, and the like. In circumstances with the angle between the adjacent surfaces and the direction in which molding pressure is applied, is sufficiently large, no difficulties exist because the mixture of ligno-cellulose particles and binder is simply made to the required thickness in accordance with the desired compression ratio, and then introduced into the mold cavity in suitable manner, for instance manually or by means of a mechanical device. Thereupon, the molding operation is carried out.

Problems arise if the size of the angle, that is the dispersing angle, included between the inclined surfaces and the direction in which pressure for molding purposes is exerted, is exceeded; then these bodies must be produced in such a manner that the mixture is first introduced into an area which is defined, for example, between the surfaces of a core and the pressure surfaces of lateral dies with a quantity of the mixture which is intended for forming the horizontal or substantially horizontal surfaces of the body is usually placed upon the upwardly facing surfaces of this core. Now, suitable dies are moved into the mold from above and from one or more sides until the material has been compressed to the desired extent. It is also possible to insert certain portions of the mold or die into the cavity from above and other ones from below, simultaneously or in a predetermined sequence. These approaches are not entirely satisfactory because they are very complicated and expensive, especially because the dies utilized must be accurately constructed to insure proper operation of the molding apparatus. Also, the number of different dies and molding tools is relatively large which increases the cost of an apparatus utilized for such purposes.

Attempts have been made to solve the problem if the body to be molded is to be a hollow body, by molding the body piecemeal. This is done by molding individual portions of the body which can be molded in flat or substantially flat shape, and the thus-obtained blanks which are produced in a cold-molding stage, are subsequently joined in a hot-molding process to combine them and form of them an integral hollow body. However, this is quite clearly very complicated and requires a large number of individual tools so that this approach is expensive. Aside from this it will be appreciated that the application of this approach is limited to hollow bodies whose configuration lends itself to the initial manufacture of flat or substantially flat blanks which can then be subsequently united, and it is clear that there are many configurations of hollow bodies to which this approach is simply not applicable.

SUMMARY OF THE INVENTION

It is, accordingly, an object of the present invention to overcome the aforementioned disadvantages.

More particularly it is an object of the present invention to provide an improved method which makes it possible to mold a body having one or more surfaces which extend at a steep angle to an adjoining surface which may be horizontal or substantially horizontal during the molding, and in which these surfaces form substantially the boundary surfaces of plate-shaped or wall-shaped parts of the body.

It is a concomitant object of the invention to provide such a method which can be carried out without requiring expensive special-purpose dies and without requiring complicated additional molding steps.

Another object of the invention is to provide such a method which permits the molding of such bodies having a relatively complicated shape.

In pursuance of the above objects, and others which will become apparent hereafter, one feature of the invention resides, briefly stated, in a method of making a molded body from ligno-cellulose particles in a cavity provided in one of two die sections and having an open side, a surface opposite the open side, and an exposed face extending between the open side and the surface and defining with the latter a steep angle. This method comprises the steps of introducing into the cavity a mixture of ligno-cellulose particles and binder material, inserting the other die section into the open side and effecting relative movement of the die sections in a sense advancing the other die section past the exposed face and towards the surface. During such movement, the mixture between the other die section and the exposed face is maintained against displacement in direction towards the surface bounding the cavity.

Resort to the present invention provides the advantage that even if there is a very steep angle included between the exposed face and the surface bounding the cavity, the individual particles of the mixture to be converted into the molded body will remain in their positions during the molding operation without being taken along towards the surface by the other die section during the relative movement of the two die sections. This insures that the mixture will be compressed at all times to the required ratio.

It will be appreciated that in the molding of bodies having such surfaces which are so steeply inclined with reference to one another as pointed out above, the primary difficulty results from the fact that even if the surface of the inserted—as yet uncompressed-mixture is horizontally oriented or has a small angle of inclination to the direction of movement performed by the two die sections, the downwardly moving die section has the tendency to carry along the mixture in the direction of its movement towards the surface bounding the cavity opposite the open side of the latter, instead of merely compressing the mixture. The reason for this is that the fibrous consistency and the provision of the adhesive binder in the mixture causes the particles of the mixture to interengage everywhere with each other and to adhere to each other. Thus, when the material is carried along between the upper die section and the exposed face in the cavity, irregular distribution of the mixture takes place and the finished molded body will be insufficiently compressed in some locations and excessively compressed at other locations. This problem is overcome according to the present invention by preventing the material from being carried along, and this is achieved by giving the exposed face of the mold cavity and the face in the other die section which will subsequently be juxtaposed with the exposed face of the mold cavity, different surface consistencies or configurations. According to one embodiment of the invention this may be achieved by making one of these faces smooth whereas the cooperating face is stepped. This has the result that the fibrous mixture will be held back by each of the steps which will normally extend transversely of the direction of movement of the dies, and will be separated by the edges of the individual steps from the adjacent material adhering thereto which is pressed further downwardly without being taken along by such material. The more sharply the outer edges of the individual steps are defined, the more effective the construction will be. It is preferable that the upwardly facing surfaces or face portions of the individual steps, that is the face portions which face the open side of the cavity, and also the face portions which extend substantially parallel to the direction of movement, preferably extend at right angles to each other or enclose an angle of less than 90°.

The mixture to be molded may of course be introduced in various different ways into the cavity, either manually, or mechanically by means of a dispersing or pouring apparatus of known construction. If the material is introduced into the mold cavity in such a manner that the thickness of the layer of mixture in the mold varies, for instance in such a manner that the lower portions of the mold cavity are covered by a thickness of material which is greater than that in the upper portions, this must be taken into account to obtain a uniform compression ratio, by so designing the mold cavity that the angle between the direction in which pressure is exerted and the inclined face which is smooth is larger than the angle between the direction of pressure and an imaginary line which intersects the edges of the individual steps in the stepped face. The wall thickness of the part of the finished molded body which is provided with the steeply inclined face will then gradually increase, for example from its upper to its lower end, and the horizontal or substantially horizontal wall portion in which this inclined wall terminates for instance at the lower end, is then of a greater thickness than similar also horizontal wall portion into which the upper end of the inclined wall terminates.

For purposes of the present invention it is, of course, immaterial which of the two die sections move with reference to the other, and whether one die section moves upwardly or the other downwardly, or whether they both move towards one another during the molding operation.

If, for example, the present invention is utilized for producing a hollow body by means of a female die having in its cavity a stepped exposed face and a male die having smooth outer surfaces and which during the molding operation moves into the cavity of the female die, the molding mixture may first be introduced into the cavity so that it fills the latter entirely and even projects upwardly beyond the open side of the mold cavity to the extent necessary to obtain subsequently the desired compression ratio. The upper surface of the thus-introduced mixture will then be so shaped that it has a horizontal plane. In this case the male and female dies must be so designed so as to comply with the earlier-mentioned conditions if the same compression ratio is to be attained at all points. It is naturally then necessary not only to assure that the wall thickness of the finished molded body increases in the direction towards its bottom, but also that the greatest thickness of the bottom part be taken into account in so far as the length of the male die is made smaller than the depth of the cavity in the female die, so that the lower bottom face of the male die is spaced at a greater distance from the corresponding surface at the bottom of the mold cavity in the female die when the upper edge of the male die remains spaced from the upper edge of the mold cavity when the compression or molding step is concluded. A hollow body thus produced has a gradually increasing wall thickness and the thickness of its bottom wall is greater than the thickness of the side wall at the upper end thereof.

If it is desired to avoid too great a differential in the thickness of the side wall, or if it is desired to obtain a uniform wall thickness at all points, the mixture may be filled into the mold cavity in such a manner that it will first form a planar upper surface, whereupon a quantity of the mixture is again removed—for instance manually—to obtain a trough-shaped recess formed in this upper surface. In this case the finished molded body produced will have such a configuration that its wall thickness increases only slightly in the direction in which pressure is exerted during the molding step, or that the wall thickness is even uniform throughout.

Of course, in the interest of speed and economy it is preferable to introduce the mixture to be molded not manually, but mechanically, for instance by means of a spreading machine or by means of a blower. In this case the male tool or die is removed far enough from the cavity in the female die so that the lower portion of the cavity may be covered with a screen of a suitable type, the surface of which is of such a shape that the surface of the material or mixture which is blown into the cavity corresponds to the desired compression ratio to be attained. In this case attention must be given to the fact that the admissible angle of slope will not be exceeded, in order to prevent the material of the mixture from sliding downwardly when the screen is removed. If the mixture is blown into the cavity under a certain pressure, the admissible angle of slope may be made relatively steep because the binder-coated particles will probably then adhere sufficiently to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary vertical section through a two-section die or mold for carrying out the method according to the invention;

FIG. 2 is a fragmentary enlarged detail view of a portion of a different mold similar to that of FIG. 1;

FIG. 3 is a view similar to FIG. 2 illustrating still a further mold;

DESCRIPTION OF THE PREFERRED EMBODIMENTS

Figure 4:
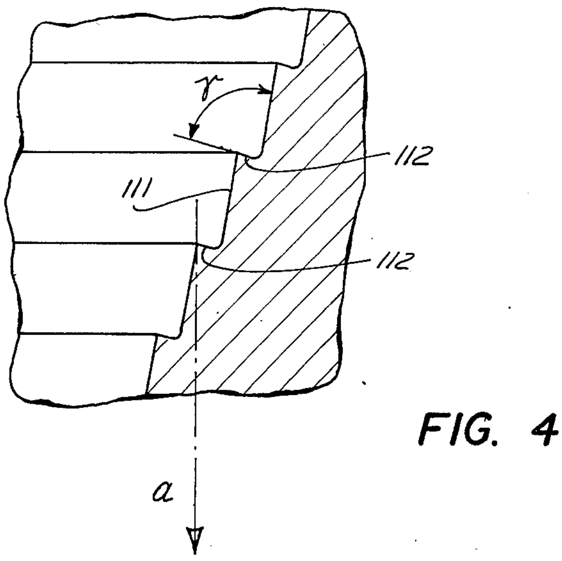
FIG. 4 is a view similar to FIG. 3 illustrating yet another mold.

Before entering into a detailed discussion of the drawing it is pointed out that in the various illustrated embodiments of molds—which are shown to permit a better explanation of the novel method—it is arbitrarily assumed that the body to be molded has a conical foot which is molded onto a horizontal plate and forms an upwardly open hollow body. The lowermost tool of the respectively illustrated two-section mold forms a female die having a cavity into which, after the required molding mixture is introduced, the corresponding male die is either moved downwardly from above whereas the lower die or female die is held in a fixed position, or wherein conversely the lower die is pressed from below upwardly against the upper male die which is held in fixed position. In the subsequent description it is assumed for purposes of explanation only that the upper male die is moved from above downwardly into the fixed or stationary lower female die.

With these comments in mind, and considering firstly FIG. 1, it will be seen that the lower female die section is identified with reference numeral 1 whereas the upper downwardly moving male die section is identified with reference numeral 2. The female die section 1 has a mold cavity 1*a* having an upwardly directed open side and the direction of pressure, that is the direction in which the male die 2 is moved into the mold cavity 1*a*, is indicated by the arrow *a*.

In accordance with the present invention, the lateral face bounding the mold cavity 1*a* is stepped and each of the thus-provided steps 11 has a surface 111 which extends in parallelism or substantially in parallelism with the direction *a*, and is thus substantially vertical. A substantially horizontal surface 112 cooperates with and extends at substantially a right angle to the respective surface 111. Conversely, the surfaces of the male die which are to enter the mold cavity 1*a* are not stepped, but instead are entirely smooth.

As the drawing shows, the lateral face 21 of the relatively conical upper male die 2 is inclined at an angle $\alpha$ which is larger than the angle $\beta$ included between the direction *a* of molding pressure and the direction of an imaginary line *x* which connects the free edges of the individual steps. The lower pressure surface 22 of the male die 2 is rounded in substantially spherical configuration and merges smoothly into the lateral face 21. The total length L of the active part of this male die 2 is shorter by a predetermined distance than the depth T of the mold cavity 1a so that the thickness of the lateral wall of the hollow element which is produced during the molding operation increases in downward direction whereas the bottom wall of the finished molded body will have the greatest thickness.

As shown in FIG. 2, each upwardly directed surface 112 of the respective steps 11 may extend exactly normal to the direction of pressure *a* so that the angle $\gamma$ included between each such surface 112 and the surface 111 of the preceding step 11 amounts to 90°.

In some cases, however, it is of advantage to utilize the embodiment illustrated in FIG. 3. Here, the angle $\gamma'$ included between the surfaces 111 and 112 is less than 90° and with such a configuration the individual particles of the molding mixture are more reliably prevented from sliding downwardly along the face provided with the steps 11 in the direction of pressure *a*, when the male die 2 moves into the mole cavity 1*a*. Thus, the molding mixture on the upper side of the surfaces 112 will be actually and fully compressed at this particular point. It is pointed out, however, that an angle of more than 90° between the adjacent surfaces 112, 111 of two successive steps 11 should be definitely avoided, because the particles of the molding mixture would then not be reliably prevented from sliding downwardly in the direction *a* during the molding operation.

As shown in FIG. 4, it is also possible to so configurate the surfaces 111 that they do not extend directly parallel to the direction of pressure *a*, but instead are inclined at a certain angle to this direction. In this case it is of great importance that they substantially horizontal surfaces 112 of the individual steps 11 will not be included so that the particles of the molding material will not have the tendency to slide along the direction of the arrow *a*, and the angle $\gamma$ should therefore not be larger than 90°.

FIG. 2 shows that the outer free edges 35 of the individual steps 11 should preferably be made as sharp as possible. On the other hand, the inner edges 38 between the successive steps 11 are preferably slightly rounded in order that the corresponding edges formed on the finished molded body will be more resistant to chipping or breaking off.

Figure 5:
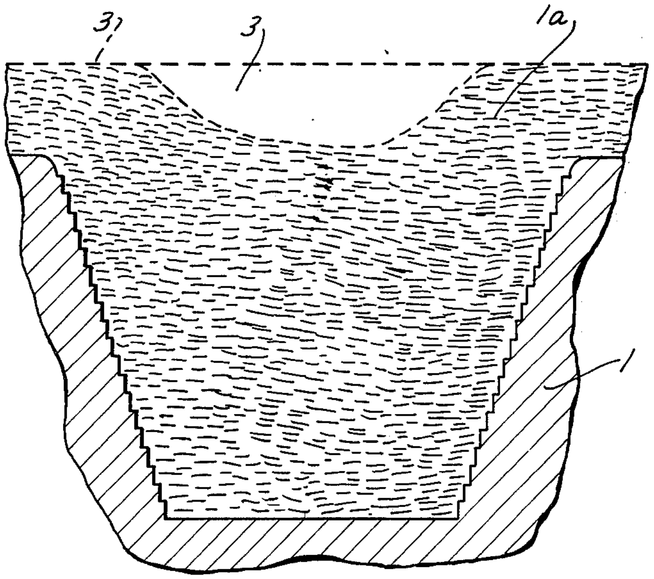
FIG. 5 is a vertical section through the female mold part shown in FIG. 1, but illustrating it as filled manually with mixture to be molded.

In the embodiment of FIG. 5 I have illustrated a lower female die 1 in which the mold cavity 1*a* is filled with molding material which in this embodiment is assumed to have been introduced manually. To prevent the bottom part of the finished molded body from becoming too thick, and to prevent the lowest portions of the finished molded body from becoming excessively compressed, the upper surface 3 of the molding mixture which has been introduced into the molding cavity—and which would normally be planar—is provided at 3′ with a depression which is formed by removing manually a part of the molding mixture above the center of the mold cavity 1*a*, after the latter has been filled with the mixture.

Figure 6:
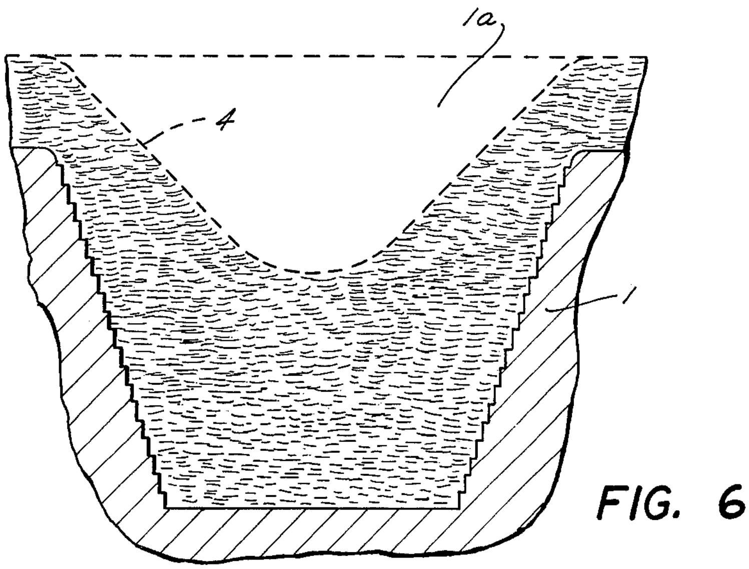
FIG. 6 is a view similar to FIG. 5 but illustrating the female mold section as covered with a screen and with the mixture blown into the mold section.

For economic reasons and for others it is of course advisable not to utilize manual filling, and it is preferable not even to use a spreading machine for the filling purposes, especially if the mold is of a relatively complicated shape. Instead, it is preferred to insert the molding mixture by blowing it into the mold while the upper surface configuration of the mixture which can be formed is limited during the blowing process by a screen of a suitable shape which can subsequently be removed before the molding operation is carried out. This is shown in FIG. 6 wherein a screen 4 is shown superimposed above the upper open side of the mold cavity 1a in the lower die 1. The material is blown into the mold chamber or cavity 1a between the screen 4 and the female die 1. Preferably, the walls of the screen 4 are inclined substantially similarly to the external shape of the upper die 2, and in any event at angles not exceeding the angle at which the molding material might slide downwardly of its own accord, that is the slope angle. If the wall bounding the mold cavity 1a is inclined at a suitable angle, the molding mixture can be blown into the cavity in such a manner that when the hollow molded body has been finally compressed, it will have a uniform density and also a uniform wall thickness.

Figure 7:
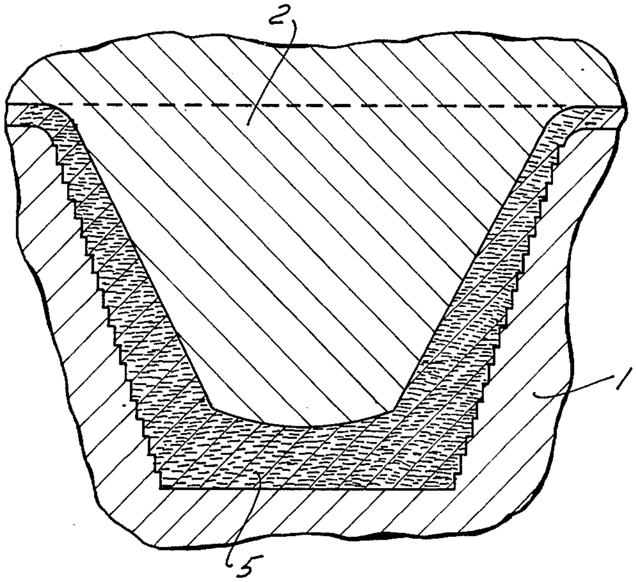
FIG. 7 is a vertical section similar to FIG. 6 showing the material at the end of the molding step.

After the mold cavity in the lower female die 1 has been filled, either in the manner shown in FIG. 5 or in the manner shown in FIG. 6, the upper male die 2 is moved downwardly into the lower female die 1 and the molding mixture is compressed in accordance with the dimensions of the upper and lower dies, as illustrated in FIG. 7. In that Figure it will be seen that the thickness of the walls of the finished molded body 5 increases in the direction towards the bottom of the body, that is in the direction of the pressure *a*.

Figure 8:
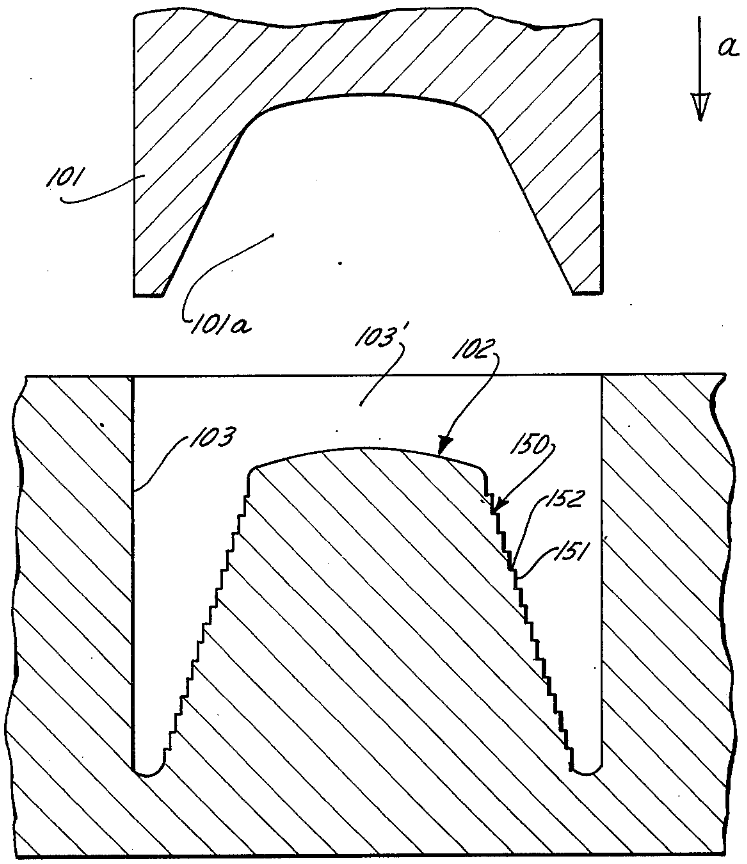
FIG. 8 is a fragmentary vertical section of a further two-part mold.

In FIG. 8 I have illustrated another embodiment of the invention in which it is assumed that a molded element of a U-shaped cross-section is to be produced, which is open at both ends and which has a smooth outer surface and an inclined inner surface of any desired shape. In this embodiment the lower female die 1 has such a mold cavity configuration that the inner surface forms a core 102 similar to a male die and extending in the longitudinal direction of the U-shaped cross-section. The lateral surfaces bounding the cavity forms steps 150 provided in accordance with the present invention. Each of these steps 150 has a surface 151 extending in substantial parallelism with the direction of pressure *a* and an upwardly facing surface 152 facing oppositely the direction *a*. Both of these surfaces of each step 150 extend substantially at a right angle to each other in the same manner as previously discussed, but the steps may also be of a shape substantially as described with reference to FIGS. 2–4 if desired.

To limit the size of the molding cavity the latter is defined by plane vertical surfaces 103 which extend substantially parallel to the central plane of symmetry of the U-shaped cross-section, and by smooth plane surfaces 103' extending normal to the surfaces 103 and connected with the core 102. The upper die in this case is a female die 101 of downwardly open trough-like shape with smooth surfaces, with the trough-like configuration being open at opposite longitudinal ends and adapted to be moved into the molding cavity defined by the walls 103 and 103' and the steps 150.

If it is assumed that the mold cavity is filled to such an extent with molding mixture that the upper side thereof forms a planar surface the central part of which covering the pressure surface portion 102 in the lower die forms a layer the thickness of which is in accordance with the desired rate of compression of the finished molded product. In this case the upper die 101 must of course be so designed that to obtain a uniform compression ratio the finished product will have a gradually increasing wall thickness, the greatest thickness of which is located along the free edges of the two legs of the U-shaped cross-section. This means that the depth of the recess 101*a* in the upper die 101 must be smaller than the height of the upwardly projecting part 102 of the lower die, and the lateral inner surfaces of the upper die 101 must be inclined relative to the direction of pressure *a* at an angle which is larger than the imaginary line connecting the outer edges of the individual steps 150 in the lower die.

Figure 9:
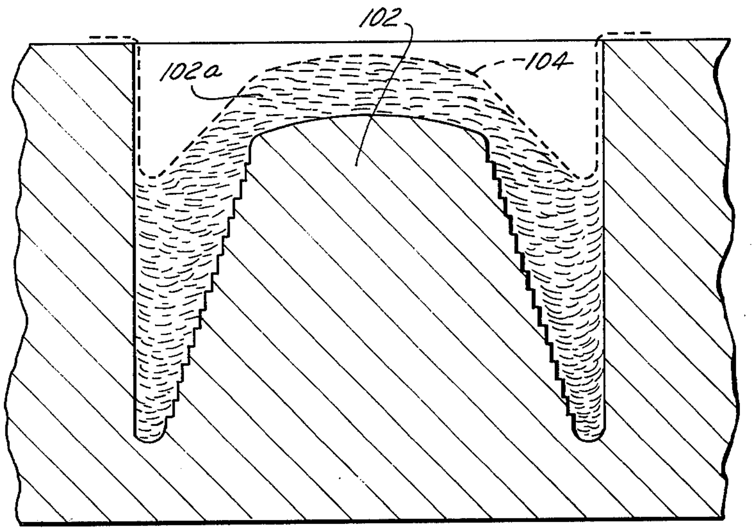
FIG. 9 is a fragmentary vertical section through the female mold section of FIG. 8, with the mixture to be compressed blown into the mold cavity.
Figure 10:
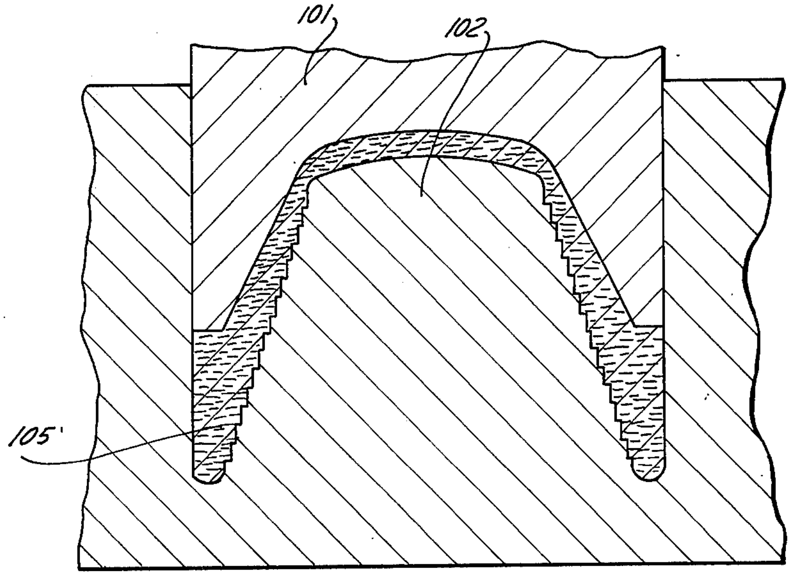
FIG. 10 shows the male and female mold sections of FIG. 8 at the end of the compression step for compressing material which has been introduced according to FIG. 9.

As already pointed out, the molding mixture may be blown into the mold while the lower die is covered by a screen. In this case the screen may be so designed that the U-shaped cross-section may be made of any other wall thickness as long as the admissible pouring angle will not be exceeded. FIG. 9 illustrates the lower die as containing molding mixture which is blown into it, with the upper open side of the lower die covered by a screen 104 having such a configuration that the upper surface of the molding material blown into the lower die and identified with reference numeral 102 will have a shape somewhat similar to the shape of the lower die. After the material has been blown in, the screen 104 is removed and the upper die 101 is then moved downwardly into the lower die, thereby carrying out the molding operation until the molding mixture has been compressed to the desired extent and the two dies have reached the relative positions illustrated in FIG. 10. The thus-compressed molding mixture then forms a solid body 105 having the configuration illustrated in FIG. 10.

It goes without saying that if the binder component of this mixture is of the heat-setting type, the compressed body 105 may at the same time be cured by heating in known manner.

Figure 11:
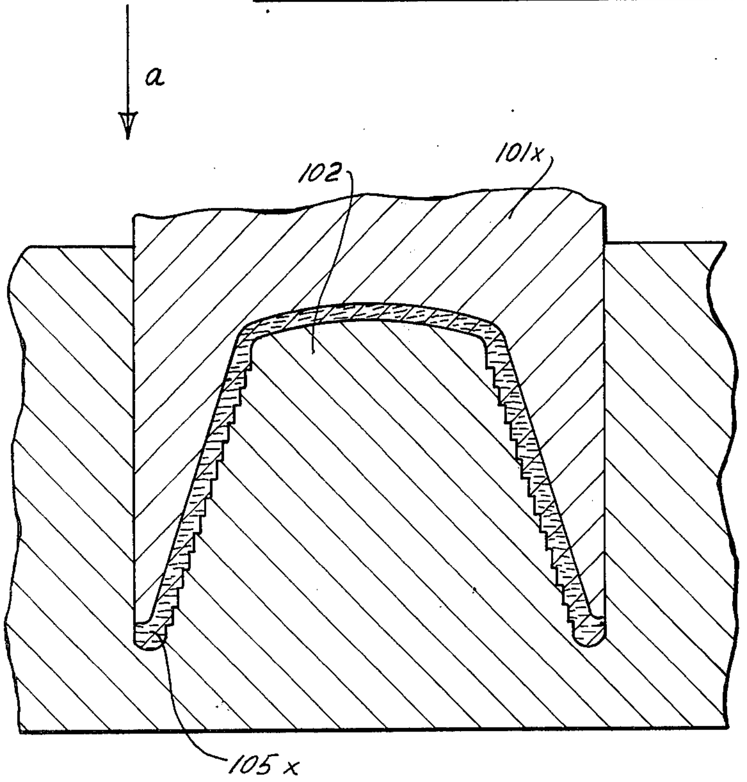
FIG. 11 is a view similar to FIG. 10 but showing an embodiment in which a molded body of substantially uniform wall thickness is to be produced.

If it is desired to make the thickness of the walls of the molded body 105 uniform, instead of having the thickness of the side legs increase towards their free edges, the embodiment of FIG. 11 may be resorted to. Here, the angle included between the direction of pressure *a* and the lateral surfaces bounding the cavity in the upper die 101*x* must correspond exactly to the angle between the direction of pressure *a* and the imaginary line intersecting the edges of the individual steps in the lower die 102. The resulting molded body 105*x* will then have the shape shown in FIG. 11. It is pointed out, however, that a uniform wall thickness may also be obtained even if the different parts of the lower die are filled to different heights, for example as shown in FIG. 9. In this case, however, an unequal compression ratio at different points must be accepted; thus, in such a case the density of the material in the compressed body would increase toward the bottom of the hollow molded body, or else it would increase toward the free edges of the arms of the U-shaped cross-section as is the case in FIG. 8.

Figure 12:
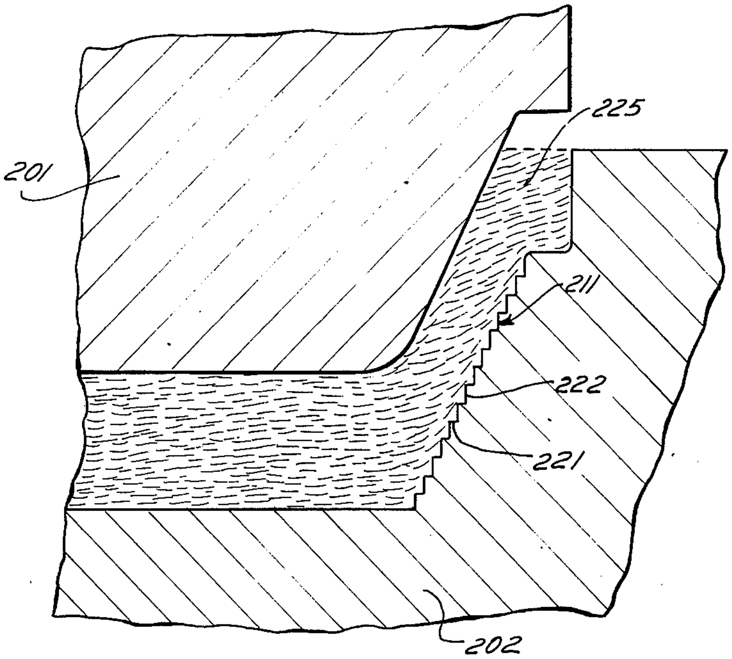
FIG. 12 is a fragmentary vertical section illustrating a further embodiment of the invention.
Figure 13:
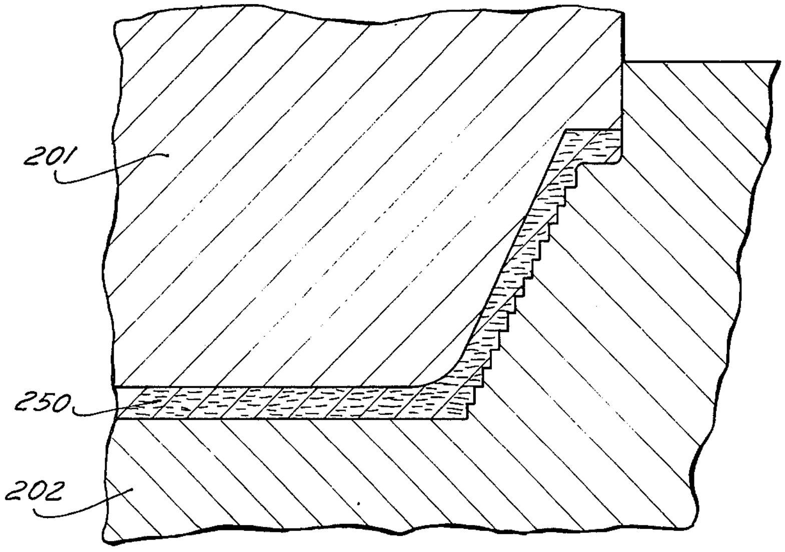
FIG. 13 is a view showing molds used in FIG. 12 at the end of a compression operation.

Coming, finally, to the embodiment illustrated in FIGS. 12 and 13, it wll be seen that this relates to a mold for producing a flat plate-shaped body one edge portion of which forms a wall projecting upwardly at an oblique angle, while the other end of this inclined wall is provided with an outwardly projecting horizontal part. Here, the lower die 202 is configurated as a female die and the upper die 201 as a male die. As shown in FIG. 12, the mold is in open position with the left part being broken away because it is not needed for an understanding of the invention. Steps 211 are provided in the oblique angled face of the lower die 202, and the upwardly directed face portions 221 of the individual steps 211 may incline with respect to their face portions 222—which extend substantially in the direction of pressure *a*—in accordance with the considerations outlined with reference to FIGS. 2, 3 or 4 as may be desired in each case. The lower die 202 is provided with a recess 225 and the upper die 201 with a corresponding projection to produce the outwardly projecting part on the upper end of the inclined wall of the finished body.

As the drawing shows, the upper die 201 has smooth surfaces and its obliquely inclined pressure face is disposed at the same angle to a horizontal plane as the imaginary line which extends through the free edges of the steps 211. The upper die 201 is designed so that the flat plate of the finished molded body will have a greater thickness than the upwardly inclined wall portion and the outwardly projecting part thereof.

As shown in FIG. 3, where the mold is shown in closed position at the end of the molding operation, the finished molded body is identified with reference numeral 250.

It is again emphasized as was done before, that the assumption that the lower die section is stationary and the upper die section moves downwardly with respect to it, which has been made for the illustrated embodiments, is purely for the sake of convenience and that the die sections may both move with reference to one another, or that the upper die section may be stationary and the lower die section may move upwardly with reference to it. Similarly, other modifications will offer themselves readily to those skilled in the art, for instance for the production of molded elements or bodies in which adjoining surfaces are inclined with reference to one another at a steep angle other than a right angle.

It will be understood that each of the elements described above, or two or more together, may also find a useful application in other types of constructions differing from the types described above.

While the invention has been illustrated and described as embodied in the molding of bodies from ligno-cellulose particles, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of making a molded body from ligno-cellulose particles in a cavity, comprising the steps of providing a first die section and a second die section having a cavity which is formed with an open side, a surface opposite said open side, and an exposed face extending at a steep angle to said surface from the periphery of the latter to said open side; pouring a tacky but pourable mixture of ligno-cellulose particles and an adhesive binder material into said cavity to a depth which is greater in the region of said periphery and lesser in the region inwardly spaced from said periphery; inserting said first die section into said open side and effecting relative movement of said die sections in a sense advancing said first die section along said exposed face and towards said surface; and retarding the pourable mixture in a space between said first die section and said exposed surface against displacement in direction towards said surface so that due to such retardation the mixture will be subjected to uniform pressure everywhere in said space.

2. A method as defined in claim 1, said first die section having a face directed towards said exposed face during said relative movement of said die sections; and wherein the step of retarding said mixture comprises providing one of said faces with a surface texture different from that of the other face.

3. A method as defined in claim 2 wherein the step of providing different surface textures comprises providing said face with a smooth surface texture and providing said exposed face with sharp-edged profiling which extends at least in part transverse to the direction of relative movement of said die sections.

4. A method as defined in claim 1, wherein the step of forming comprises introducing the mixture in such a manner that its exposed surface defines with the horizontal an angle which is at most equal to the pouring angle for said mixture so that the thickness of the mixture in said cavity is uneven; and wherein the step of effecting relative movement includes compressing said mixture to thereby obtain a molded body whose thickness is uneven in correspondence with the unevenness of the thickness of said mixture.

5. A method of making a molded body from a tacky but pourable mixture of particulate matter and a binder, comprising the steps of pouring into an enclosed space bounded by a bottom surface and a side which projects from the periphery of said bottom surface at a steep angle thereto, a quantity of said pourable mixture so that the depth of the latter is greater in the region of said periphery than inwardly of the same; confining the pourable mixture in the region of greater depth between said side face and a lateral face which extends along said side face; subjecting said pourable mixture between said faces to compressive force having a component acting in direction towards said surface; and retarding said pourable mixture intermediate said faces against displacement in the direction toward said surface so that due to such retardation the mixture will be subjected to uniform pressure everywhere in said space.

* * * * *